United States Patent
Halcrow et al.

(10) Patent No.: US 7,793,114 B2
(45) Date of Patent: Sep. 7, 2010

(54) METHOD FOR FORECASTING RISKS ASSOCIATED WITH SOFTWARE PACKAGES

(75) Inventors: Michael Austin Halcrow, Pflugerville, TX (US); Kylene Jo Hall, Campbell, CA (US); Dustin C. Kirkland, Austin, TX (US); Emily Jane Ratliff, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 11/566,326

(22) Filed: Dec. 4, 2006

(65) Prior Publication Data

US 2008/0134145 A1 Jun. 5, 2008

(51) Int. Cl.
*G06F 11/30* (2006.01)
*G06F 12/14* (2006.01)
(52) U.S. Cl. ..................................................... 713/193
(58) Field of Classification Search ............... 726/25; 713/193
See application file for complete search history.

(56) References Cited

U.S. PATENT DOCUMENTS

| | | | |
|---|---|---|---|
| 6,327,706 B1 | 12/2001 | Amberg et al. | |
| 6,347,398 B1 | 2/2002 | Parthasarathy et al. | |
| 6,477,703 B1 | 11/2002 | Smith et al. | |
| 6,912,676 B1 | 6/2005 | Gusler et al. | |
| 7,353,389 B2 * | 4/2008 | DeFuria et al. | 713/168 |
| 7,546,595 B1 * | 6/2009 | Wickham et al. | 717/168 |
| 2003/0115511 A1 * | 6/2003 | Kubota | 714/47 |
| 2005/0283751 A1 | 12/2005 | Bassin et al. | |
| 2006/0048129 A1 * | 3/2006 | Napier et al. | 717/168 |
| 2006/0191012 A1 * | 8/2006 | Banzhof et al. | 726/25 |

OTHER PUBLICATIONS

Stanley et al., "A new tool and new processes to enhance software reliability", ISS'97: World Telecommunications Congress. "Global Network Evolution: Convergence or Collision?" Proceedings, vol. 2, Toronto, Canada, 1997, pp. 527-531.
Tevis et al., "Methods for The Prevention, Detection And Removal Of Software Security Vulnerabilities", ACM Southeast Conference '04, Huntsville, Alabama, Apr. 2-3, 2004, pp. 197-202.
Neumann et al., "Risks to the Public in Computers and Related Systems", ACM Software Engineering Notes, vol. 29, No. 4, May 2004, pp. 7-14.

(Continued)

*Primary Examiner*—Kambiz Zand
*Assistant Examiner*—Jason K Gee
(74) *Attorney, Agent, or Firm*—Yee & Associates, P.C.; Matthew W. Baca (57) ABSTRACT

A computer implemented method, a computer program product, and a data processing system are provided for forecasting risks associated with installing software packages. A software package is selected for installation on a data processing system. The number of updates issued for each software package within the package list is determined within a specified past period of time. Based on the number of updates for the package list over the past period of time, an estimate of the number of updates likely to be issued over a specified future period of time is calculated. The number of updates estimated over the future period of time is an indicator of the risk associated with the installation of software packages on the package list.

18 Claims, 3 Drawing Sheets

OTHER PUBLICATIONS

Neumann et al., "Risks to the Public in Computers and Related Systems", ACM SIGSOFT, Software Engineering Notes, vol. 27, No. 3, May 2002, pp. 5-19.

Brykczynski et al., "Reducing Internet-Based Intrusions: Effective Security Patch Management", IEEE Software, IEEE Computer Society, 2003, pp. 50-57.

"Introduction to Monte Carlo Methods", retrieved Nov. 30, 2006, pp. 1-2. http://www.ipp.mpg.de/de/for/bereiche/stellarator/Comp_ sci/CompScience/csep/csep1.phy.ornl.gov/mc/mc.html.

U.S. Appl. No. 11/195,024, filed Aug. 2, 2005, Hirsave et al.

U.S. Appl. No. 11/195,037, filed Aug. 2, 2005, Hirsave et al.

* cited by examiner

METHOD FOR FORECASTING RISKS ASSOCIATED WITH SOFTWARE PACKAGES

The present invention is related to similar subject matter of co-pending and commonly assigned U.S. patent application Ser. No. 11/195,037 entitled "METHOD, APPARATUS, AND PROGRAM PRODUCT FOR AUTONOMIC PATCH RISK ASSESSMENT," filed on Aug. 2, 2005, and U.S. patent application Ser. No. 11/195,023 entitled "METHOD, APPARATUS, AND PROGRAM PRODUCT FOR AUTONOMIC PATCH DEPLOYMENT BASED ON AUTONOMIC PATCH RISK ASSESSMENT AND POLICIES," filed on Aug. 2, 2005, both of which are hereby incorporated by reference.

BACKGROUND OF THE INVENTION

1. Field of the Invention

The present invention generally relates to an improved data processing system and, in particular, a method and apparatus for installing software packages on the data processing system. Still more particularly, the present invention relates to a computer implemented method, apparatus, and computer usable program code for forecasting risks associated with software packages being selected for installation on a data processing system.

2. Description of the Related Art

Most software packages installed on data processing systems require updates from time to time. Among other reasons, the updates are a result of security loopholes and erroneous software code identified and fixed after the release of the software package. Updates to a software package may also be required because of improved technology that becomes available after the release of the software package. As a result, updates may be needed not only for security purposes, but also for performance improvement, correction of malfunctions, support of specific hardware or software, and other similar reasons.

Some updates are installed as they become available, while other updates may need to be installed during a reinstall or other major reconfigurations, for example, in production environments. A production environment is one or more data processing systems that are actually being used by the intended users, such as customers. Typically, an update can be applied more freely on as-available basis in non-production environments. Updates to production environments are fewer and more restricted because of the possibility of service disruptions.

Administrators of data processing systems have a responsibility to manage the risks in installing software packages on those systems. Having to update software packages to keep them functioning as desired is one such risk. Fewer installed software packages imply that fewer updates are needed to be installed on a system. For this reason, administrators of data processing systems try to keep the number of software packages installed on a data processing system as low as possible.

Presently, administrators of data processing systems rely on their experience and intuition when selecting software packages to install on a data processing system. For example, a software package that does not require frequent updating is more desirable over another software package for similar use but requiring frequent updates.

SUMMARY OF THE INVENTION

The illustrative embodiments provide a method, an data processing system, and a computer program product for forecasting risks associated with installing software packages. A software package is selected for installation on a data processing system. A past period of time is specified and a number of updates issued for the software package within the past period of time is calculated. A future time period is specified within which the risk is to be computed. Number of updates expected to be issued for the software package within the future time period is estimated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
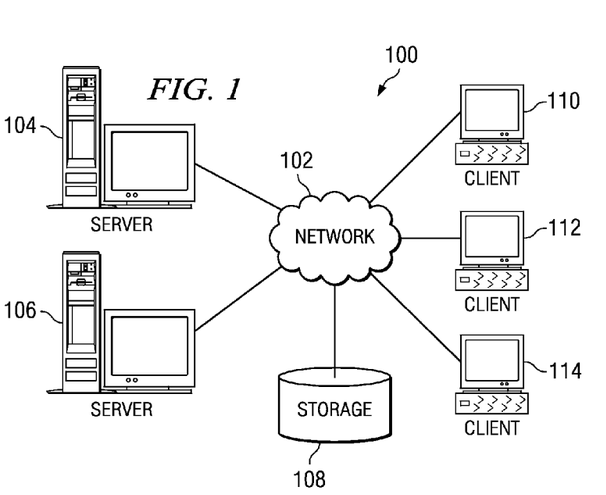
FIG. 1 depicts a pictorial representation of a network of data processing systems in which aspects of the present invention may be implemented.
Figure 2:
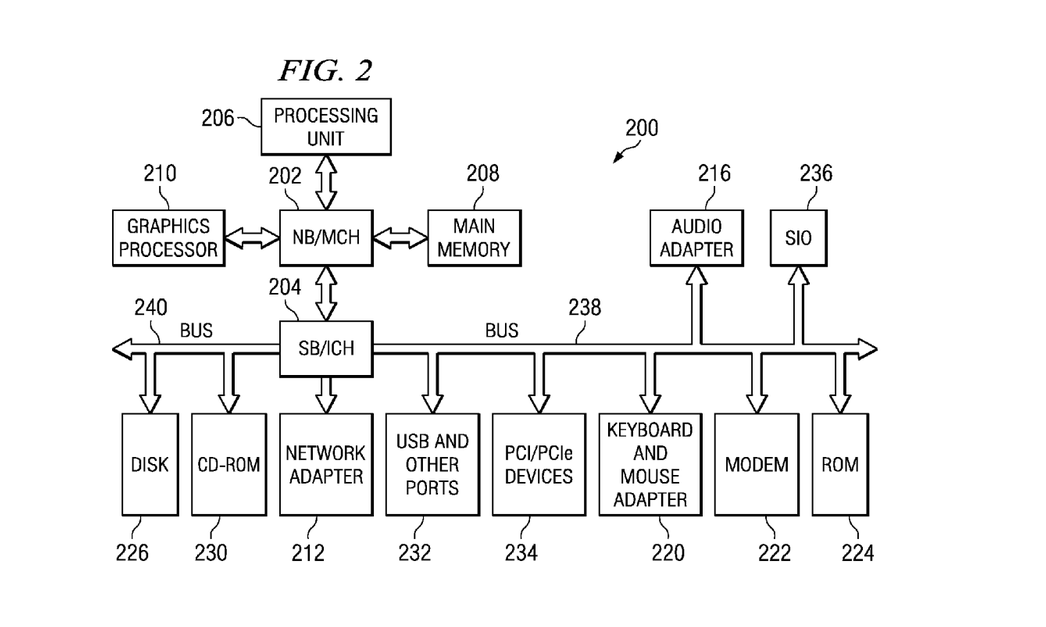
FIG. 2 is a block diagram of a data processing system in which aspects of the present invention may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Linux®, or Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Administrators of data processing systems install and manage software packages on individual data processing systems as well as networked data processing systems. For example, an administrator may be responsible for installation of software packages on client data processing systems, such as client 110-114 in FIG. 1, or servers, such as server 104-106 in FIG. 1.

An installed software package is executed by a data processing system, typically by loading the program code for the software package into the system's memory, such as main memory 208 in FIG. 2. Processor, such as processing unit 206 in FIG. 2, executes the program code. Information generated by the software package is then communicated to a user, or sent to another data processing system. Several other actions can be taken on the generated information depending on the particular software package and the specific business needs.

Upon installation, administrators have to update software packages from time to time to ensure proper functioning of the software packages and the data processing systems on which they are installed. Updates are commonly released as patches. A patch is a modification for a given software package, released by the manufacturer of the software package for addressing a later discovered defect or for making an improvement in the software package. Patching is the process of updating a software package with a patch.

Illustrative embodiments recognize that updating software packages requires not only time and effort, but also a conscious understanding of the complex interactions among software packages and unintended side effects of updating software packages. For example, updating one software package may cause another software package to malfunction, or create a new vulnerability in the other software package. However, the only guidance for the administrators, for selecting the various software packages, is derived from the administrator's own knowledge and experience. Such a method of selecting software packages has a high likelihood of being prone to errors. Furthermore, the illustrative embodiments recognize that the administrator frequently perform substantial research in making the selections, which can be very time consuming.

Updating a software package may cause undesirable effects in the software package being updated as well. For example, a system specific policy may be lost as a result of an update, creating a security vulnerability that was not present prior to the update. As another example, an update, when installed, may consume significant memory or processor cycles. Updating a software package with such an update may cause the performance of the data processing system to degrade beyond an acceptable level. Therefore, illustrative embodiments recognize that selecting software packages for installation based on administrators' experience and knowledge can have these types of unintended effects if a mistake is made in the selection process.

Another type of risk is the likelihood that an update will disrupt activity of the data processing system. For example, a reboot is a very disruptive action. As another example, if a large amount of memory is being used by the server, a high likelihood exists that updating will negatively affect the productivity of the data processing system. Because of these and similar reasons, updating software packages inherently involves risks about the security, performance, and integrity of the data processing system. Therefore, it would be advantageous to have an improved computer implemented method, data processing system, and computer usable program code to assist in minimizing the security risks associated with installing software packages.

Often, several software packages are installed together on a data processing system. A package list is a list of software packages contemplated to be installed, added, or modified on a data processing system. Illustrative embodiments provide a method for forecasting the number of updates a given package list will likely need given the historic information about the updates for the software packages on the package list. The number of updates corresponds with the level of risks associated with the updates. Therefore, the forecast is indicative of the level of risk associated with a package list an administrator is considering for a data processing system.

Figure 3:
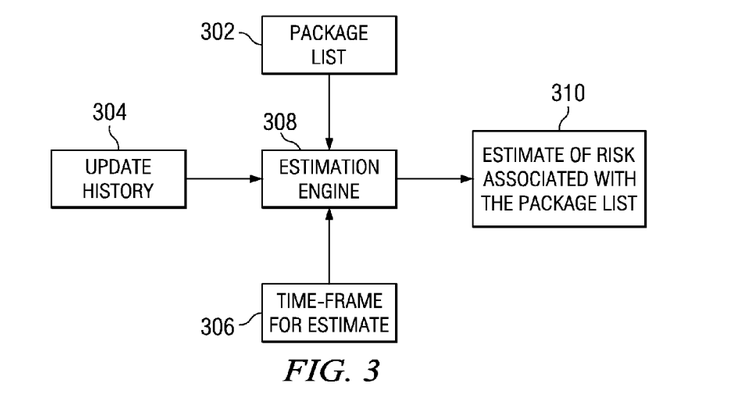
FIG. 3 is a block diagram of a system for forecasting risk, depicted in accordance with an illustrative embodiment.

With reference now to FIG. 3, a block diagram of a system for forecasting risk is depicted in accordance with an illustrative embodiment. The system can be implemented in a data processing system, such as client 110-114 or server 104-106 in FIG. 1. The system includes a package list component 302, which corresponds with the data about the package list of software packages contemplated for installation. Package list component 302 can exist in different forms, such as, for example, a data file, a database, an online repository, or other form for storing or communicating data on a data processing system.

The system further includes an update history component 304, which corresponds with the data about the history of updates related with each software package in package list 302. Update history component 304 can exist in different forms, such as, for example, a data file, a database, an online repository, or other form for storing or communicating data on a data processing system. Component 304 can include update history information of more software packages that are in a given package list. Conversely, component 304 can contain similar information about fewer software packages than are in a given package list, and more than one component 304 may collectively provide the update history of all software packages in a package list.

The system includes a future time-frame component 306, which reflects the period for which the estimate of risk is to be generated. Component 306 can also exist in different forms, such as, for example, a data file, a database, an online repository, or other form for storing or communicating data on a data processing system.

Estimation engine component 308 connects with components 302-306 and performs the computation of the risk estimate associated with a given package list. Component 310 is the risk estimate associated with package list 302. Component 310 can exist in different forms, such as, for example, a data file, a database, an online repository, or other form for storing or communicating data on a data processing system.

Figure 4:
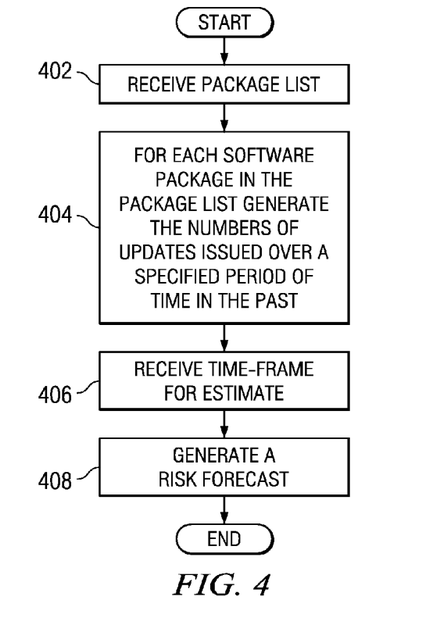
FIG. 4 is a flowchart of a process for forecasting risk, depicted in accordance with an illustrative embodiment.

With reference now to FIG. 4, a flowchart of a process for forecasting risk is depicted in accordance with an illustrative embodiment. The process can be implemented in a data processing system, such as client 110-114 or server 104-106 in FIG. 1. The process implemented in the form of a computer program product can be loaded into the memory of the data processing system, such as main memory 208 in FIG. 2. The process can then be executed by a processor, such as processing unit 206 in FIG. 2.

The process begins by receiving a package list (step 402). For each software package in the package list, the process identifies the number of updates issued over a past period of time, which is a period of time prior to the time of running the process (step 404). A past period of time may be specified based on the age of a software package on the package list, expected life of the data processing system, frequency of software releases, or other similar factors.

The process also receives a future period of time, which is a period of time for which the forecast is desired (step 406). For example, an administrator may want to know the number of updates to be expected within one year of installation, based on the number of updates issued within the past two years for the software packages on the package list. A future period of time may be specified based on the expected age of a software package on the package list, expected life of the data processing system, known frequency of software releases, or other similar factors.

The process generates a forecast of risk associated with the given package list (step 408). The process ends thereafter. Note that the forecast of risk can also be construed as a forecast of time that is estimated to pass without an update for a given package list. This forecast is the logical converse of the forecast of the risk of a number of updates over a certain period. Accordingly, a step for computing the forecast of time expected to pass with zero updates is not shown in the process but will become apparent to those of ordinary skill in the art from this disclosure.

Figure 5:
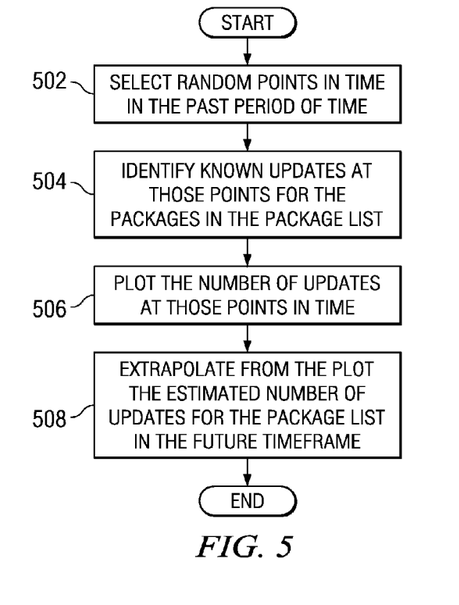
FIG. 5 is a flowchart of a process for determining risk based on historic information, depicted in accordance with an illustrative embodiment.

With reference now to FIG. 5, a flowchart of a process for determining risk based on historic information is depicted in accordance with an illustrative embodiment. The process can be implemented in a data processing system, such as client 110-114 or server 104-106 in FIG. 1. The process implemented in the form of a computer program product can be loaded into the memory of the data processing system, such as main memory 208 in FIG. 2. The process can then be executed by a processor, such as processing unit 206 in FIG. 2.

Given a period of time, the process selects a set of random points in time in that period (step 502). A set of random points in time contains one or more random points in time.

As an example, if the administrator wants to use update history of the past two years for the package list, the process selects several dates within the two years elapsed before the time of running of the process. The period of two years and selection of dates are described only as exemplary and are not intended to be limiting on the illustrative embodiments. Any period of time is conceivable for the purpose of gathering historic information on software package updates. Similarly, the process can be configured to select times instead of dates, on a random or specified basis.

Next, the process identifies the number of updates that were known or issued at each of the points in time selected in step 502 (step 504). Note that the process may be configured to identify all known or issued updates, or only those updates that are considered necessary. An update may be considered necessary by an organization according to the business needs, by administrators according to system needs, or some other factors. The step of determining which updates are necessary is not shown in FIG. 5. However, such a step will become obvious from this disclosure to those of ordinary skill in the art.

Furthermore, the process may be configured to identify only those updates that were actually installed at the selected points in time. Determination of the updates actually installed is a data processing system specific, or organization specific, inquiry. For example, information about updates that were actually installed will need to be stored in some form of a database for use in this manner. Furthermore, the database will need to provide the information for the specific data processing system where the installation of the software packages is contemplated. Such databases can be sizable depending on the number of data processing systems in the organization, and variation of installations on those data processing systems. Accordingly, this configuration of the process may be desirable for small organizations, or where fewer data processing systems are to be managed. The step of determining which updates are actually installed is not shown in FIG. 5. However, such a step will become obvious from this disclosure to those of ordinary skill in the art.

Next, the process plots the number of updates identified in step 504, at each of the selected points in time identified in step 502 (step 506). The plot can be visualized as a graph with time on the X axis, and number of updates on the Y axis. Note that the actual plotting of the data about number of updates versus time is not required. An implementation of the process may be able to compute the desired result as explained below, without actually plotting the data.

The process then extrapolates from the data about number of updates versus time to determine the desired result, which is an estimated number of updates to be expected in the future timeframe (step 508), with the process terminating thereafter. Future timeframe is the time period after the contemplated installation of the software packages within which the risk from expected updates is to be determined. The estimated number of updates to be expected corresponds with the level of risks associated with the updates.

Extrapolation is the process of creating new data points outside of the set of known discrete points. For example, each plot of data about number of updates versus points in time in the past is a discrete data point. By extrapolating, new data points of similar nature are determined, which lie in the future timeframe.

Several methods for extrapolation are known in mathematical and statistical analysis. Some methods of extrapolation can generate, not an estimated number, but the likelihood of hitting a certain number in the future timeframe. In the case of updates, such a method of extrapolation will yield, not an estimated number of updates, but the likelihood of a certain number of updates being issued within a future timeframe.

One example of a method that generates this kind of result is the Monte-Carlo method, which is an algorithm used for determining financial targets. For example, given the data about financial status of a person at discrete points in the past, the Monte-Carlo algorithm can determine the likelihood of the person being able to retire at age 68 with eighty percent income replacement. Similarly, given number of updates at discrete times in the past, the Monte-Carlo algorithm can determine the likelihood of having no updates for the next one year after installation.

Monte-Carlo algorithm is only one exemplary method for extrapolation to determine either the estimated number of updates, or the likelihood of a certain number of updates, in the future timeframe. The method of extrapolation and the result generated there from are described here only as exemplary and are not intended to be limiting on the illustrative embodiments. Those of ordinary skill in the art will be able to identify other methods of extrapolation for generating either of these results using this disclosure.

Furthermore, the estimated number of updates, or the likelihood of a certain number of updates can be determined in this manner in several administration situations. This process can be used when configuring a new data processing system with a package list containing new software packages to be installed. This process can also be used when reconfiguring a data processing system with a package list of software packages already existing on the data processing system, and software packages to be added to the data processing system.

Figure 6:
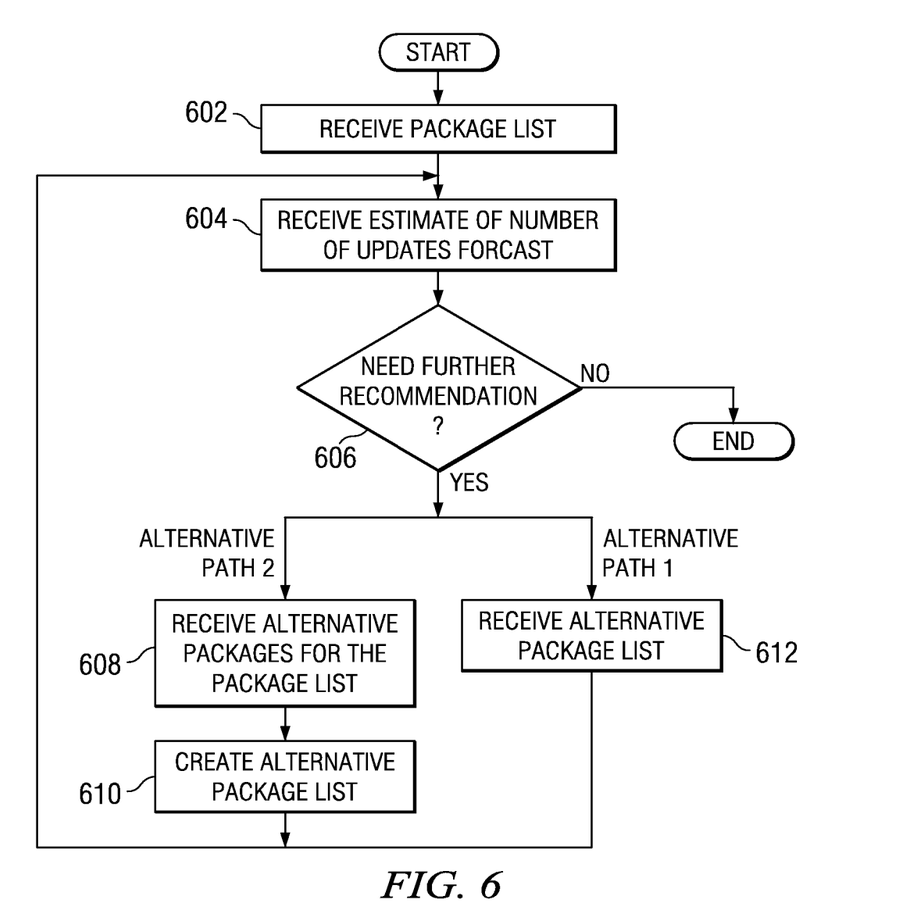
FIG. 6 is a flowchart of a process for recommending a package list with acceptable risks based on historic information, depicted in accordance with an illustrative embodiment.

With reference now to FIG. 6, a flowchart of a process for recommending a package list with acceptable risks based on historic information is depicted in accordance with an illustrative embodiment. The process can be implemented in a data processing system, such as client 110-114 or server 104-106 in FIG. 1. The process implemented in the form of a computer program product can be loaded into the memory of the data processing system, such as main memory 208 in FIG. 2. The process can then be executed by a processor, such as processing unit 206 in FIG. 2.

The process begins with receiving a package list being contemplated by an administrator (step 602). The process determines the estimated number of updates expected in the future timeframe in accordance with the process in FIG. 5 (step 604).

The estimated number of updates, or the likelihood of hitting a certain number of updates in the future timeframe is made available to the administrator. The administrator is then in a position to determine if the risks associated with the contemplated package list are acceptable. The process determines whether a recommendation for a new package list is needed based on the level of risk acceptable to the administrator (step 606).

If a recommendation is needed ("yes" path of step 606), one of two suggested steps may be taken based on the implementation of the process. The two suggested steps are marked "alternative path 1" and "alternative path 2". The process may receive alternative software packages to replace higher risk software packages on the contemplated package list (step 608). The process then creates an alternative package list with the received alternative software packages (step 610).

Step 608 may be implemented in several ways. As an example, a database can be created, which contains comparable information about several software packages. Such a database could be implemented in a data storage, such as storage 108 in FIG. 1. Step 608 could be performed by submitting a query to the database for finding software packages comparable to the software packages with higher than acceptable risks in the contemplated package list. This database-based implementation is described only as exemplary and is not intended to be limiting on the illustrative embodiments.

Other methods of performing step 608 will become apparent to those of ordinary skill in the art from this disclosure.

After determining that a recommendation for a revised package list is needed ("yes" path of step 606), a revised package list can be determined in a second suggested step. The process can simply receive a revised package list that has been revised by the administrator (step 612).

Either of the two suggested ways, steps 608-610, or step 612, can be followed for revising the package list in the process of FIG. 6. Regardless of which way is followed, the process returns to step 604 and the revised estimate of the number of expected updates is presented to the administrator.

Returning now to step 606 wherein the process determines whether another recommendation is needed, the cycle of steps 604-to-606-to-608-to-610, or the cycle of steps 604-to-606-to-612 is repeated until a package list with acceptable risk level is created and no further recommendation is needed. When no further recommendation is needed ("no" path of step 606), the process ends.

Other risk factors can be incorporated into the illustrative embodiments. For example, in addition to, or instead of, the number of updates issued at discrete times in the past, the illustrative embodiments can use other indicators of the quality of the code of software packages. A code of higher quality, statistically has a lower probability of requiring an update in a given period, and therefore poses a lower risk. The values of code-quality indicators at discrete times in the past can be plotted to estimate the risk of requiring updates for the software package.

Similarly, security information indicators associated with software packages can be used in the estimation of risk as described in the illustrative embodiments above. Security information is an indication of the level of security threat an update poses. For example, an update may correct a major flaw in the code, but require opening of new communication ports, increasing the threat of improper access to the data processing system.

As another example, security evaluations associated with software packages may also be used as a factor in the estimation of risk. For example, the updates for a particular software package may have a predetermined risk factor according to a policy. The predetermined risk factor may be a security score that the update may receive according to the policy. The risk for the package list can then be estimated based on the security scores of the various updates for the various software packages in that package list. Other similar risk factors can be used to determine risks as illustrated by the illustrative embodiments.

The illustrative embodiments describe a method for forecasting the expected number of updates for a contemplated package list. In the manner described, the illustrative embodiments remove the dependency on an administrator's knowledge and experience in selecting software packages. Illustrative embodiments provide a probabilistic estimate of the risk associated with a package list that can be uniform regardless of the knowledge and experience of the administrator handling the package list.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable medium or computer-readable medium providing program code for use by or in connection with a computer or any instruction execution system. For the purposes of this description, a computer-usable medium or computer readable medium can be any tangible apparatus that can contain, store, communicate, propagate, or transport the program for use by or in connection with the instruction execution system, apparatus, or device.

The computer-usable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiment is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for forecasting risk, the computer implemented method comprising:
   selecting a software package to install on a data processing system;
   specifying a past period of time;
   calculating a past number of updates issued for the software package within the past period of time;
   specifying a future period of time; and
   estimating, by a processing unit, a future number of updates expected to be issued within the future period of time, wherein the future number of updates is used for calculating a risk associated with installing the software package to form a package risk, and wherein the package risk is a probabilistic measure of a risk to the data processing system from installing the future number of updates.

2. The computer implemented method of claim 1, wherein the software package is one of a plurality of software packages in a package list, and wherein the future number of updates is a total of future number of updates estimated to be issued within the future period of time for each software package in the package list.

3. The computer implemented method of claim 1, further comprising:
    identifying an indicator about the package, wherein the indicator is one of a code quality indicator, and a security information indicator; and
    using the indicator in calculating the risk factor.

4. The computer implemented method of claim 1, wherein the calculating the future number of updates comprises:
    identifying a set of random points in time in the past period of time;
    identifying the past number of updates issued at each of the random points in time in the set of random points in time, to form a set of past issued updates;
    extrapolating from the set of past issued updates to forecast the future number of updates estimated to be issued within the future period of time.

5. The computer implemented method of claim 1, wherein the calculating the future number of updates comprises:
    identifying a set of random points in time in the past period of time;
    identifying a past number of updates installed at each of the random points in time in the set of random points in time, to form a set of past installed updates;
    extrapolating from the set of past installed updates to forecast the future number of updates estimated to be issued within the future period of time.

6. The computer implemented method of claim 1, wherein the future number of updates estimated to be issued within the future period of time is a probabilistic estimate.

7. A computer implemented method of claim 1, wherein the estimating step comprises:
    predicting a likelihood that the future period of time will end with zero updates.

8. A computer program product comprising a tangible computer readable medium including computer usable code for forecasting risk, the computer program product comprising:
    computer usable code for selecting a software package to install on a data processing system;
    computer usable code for specifying a past period of time;
    computer usable code for calculating a past number of updates issued for the software package within the past period of time;
    computer usable code for specifying a future period of time; and
    computer usable code for estimating a future number of updates expected to be issued within the future period of time, wherein the future number of updates is used for calculating a risk associated with installing the software package to form a package risk, and wherein the package risk is a probabilistic measure of a risk to the data processing system from installing the future number of updates.

9. The computer program product of claim 8, wherein the software package is one of a plurality of software packages in a package list, and wherein the future number of updates is a total of future number of updates estimated to be issued within the future period of time for each software package in the package list.

10. The computer program product of claim 8, further comprising:
    computer usable code for identifying an indicator about the package, wherein the indicator is one of a code quality indicator, and a security information indicator; and
    computer usable code for using the indicator in calculating the risk factor.

11. The computer program product of claim 8, wherein the computer usable code for calculating the future number of updates comprises:
    computer usable code for identifying a set of random points in time in the past period of time;
    computer usable code for identifying the past number of updates issued at each of the random points in time in the set of random points in time, to form a set of past issued updates;
    computer usable code for extrapolating from the set of past issued updates to forecast the future number of updates estimated to be issued within the future period of time.

12. The computer program product of claim 8, wherein the computer usable code for calculating the future number of updates comprises:
    computer usable code for identifying a set of random points in time in the past period of time;
    computer usable code for identifying a past number of updates installed at each of the random points in time in the set of random points in time, to form a set of past installed updates;
    computer usable code for extrapolating from the set of past installed updates to forecast the future number of updates estimated to be issued within the future period of time.

13. The computer program product of claim 8, wherein the future number of updates estimated to be issued within the future period of time is a probabilistic estimate.

14. The computer program product of claim 8, wherein the computer usable code for estimating comprises:
    computer usable code for predicting a likelihood that the future period of time will end with zero updates.

15. A data processing system for forecasting risk, the data processing system comprising:
    a storage device, wherein the storage device stores computer usable program code; and
    a processor, wherein the processor executes the computer usable program code, wherein the computer usable program code comprises:
    computer usable code for selecting a software package to install on a data processing system;
    computer usable code for specifying a past period of time;
    computer usable code for calculating a past number of updates issued for the software package within the past period of time;
    computer usable code for specifying a future period of time; and
    computer usable code for estimating a future number of updates expected to be issued within the future period of time, wherein the software package is one of a plurality of software packages in a package list, wherein the future number of updates is a total of future number of updates estimated to be issued within the future period of time for each software package in the package list, wherein the future number of updates is used for calculating a risk associated with installing the software package to form a package risk, and wherein the package risk is a probabilistic measure of a risk to the data processing system from installing the future number of updates, and the data processing system.

16. The data processing system of claim 15 further comprising:
    computer usable code for identifying an indicator about the package, wherein the indicator is one of a code quality indicator, and a security information indicator; and
    computer usable code for using the indicator in calculating the risk factor.

17. The data processing system of claim 15, wherein the computer usable code for calculating the future number of updates comprises:
- computer usable code for identifying a set of random points in time in the past period of time;
- computer usable code for identifying the past number of updates issued at each of the random points in time in the set of random points in time, to form a set of past issued updates; and
- computer usable code for extrapolating from the set of past issued updates to forecast the future number of updates estimated to be issued within the future period of time.

18. The data processing system of claim 15, wherein the computer usable code for estimating comprises:
- computer usable code for predicting a likelihood that the future period of time will end with zero updates.

* * * * *